United States Patent [19]
Ando et al.

[11] Patent Number: 5,511,061
[45] Date of Patent: Apr. 23, 1996

[54] FILTER CIRCUIT, FILTERING METHOD AND DISC ROTATION CONTROL METHOD AND APPARATUS

[75] Inventors: Ryo Ando, Tokyo; Yayoi Mochizuki, Kanagawa, both of Japan

[73] Assignee: Sony Corporation, Tokyo, Japan

[21] Appl. No.: 457,852

[22] Filed: Jun. 1, 1995

[30] Foreign Application Priority Data

Jun. 10, 1994 [JP] Japan .................................. 6-128507

[51] Int. Cl.⁶ ........................................... G11B 7/00
[52] U.S. Cl. ..................... 369/124; 369/50; 369/44.36; 360/73.03
[58] Field of Search ................. 369/50, 47, 48, 369/49, 124, 59, 54, 44.35, 44.36; 360/69, 73.08, 73.03

[56] References Cited

U.S. PATENT DOCUMENTS 5,161,142 11/1992 Okano ........................ 369/50
5,170,386 12/1992 Tateishi ........................ 369/50

*Primary Examiner*—Georgia Y. Epps
*Assistant Examiner*—Muhammad Edun
*Attorney, Agent, or Firm*—Limbach & Limbach

[57] ABSTRACT

A control signal relating to rotation of a disc or an output signal is selectively output. A selectively output signal is amplified at a first amplification factor. A signal amplified at the first amplification factor and another signal amplified at a second amplification factor are added together. An addition signal is delayed by a first delay time, and output as the output signal. The output signal is delayed by a second delay time, and then output. The signal delayed by the second delay time is amplified at a second amplifying factor, and output as said another signal to be added to the signal amplified at the first amplification factor. Selection between the input signal and the output signal is controlled in accordance with a drive mode of the disc.

6 Claims, 6 Drawing Sheets

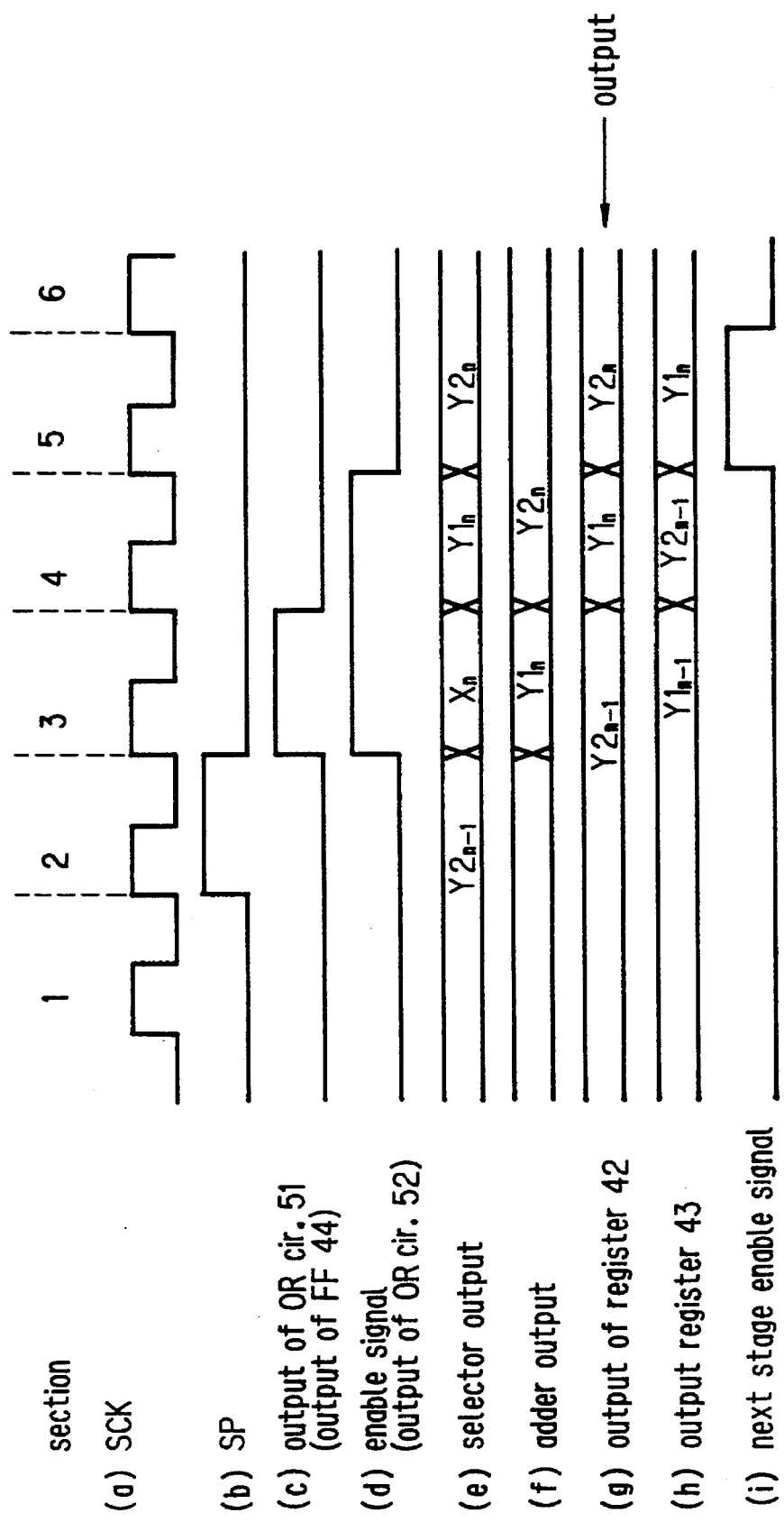

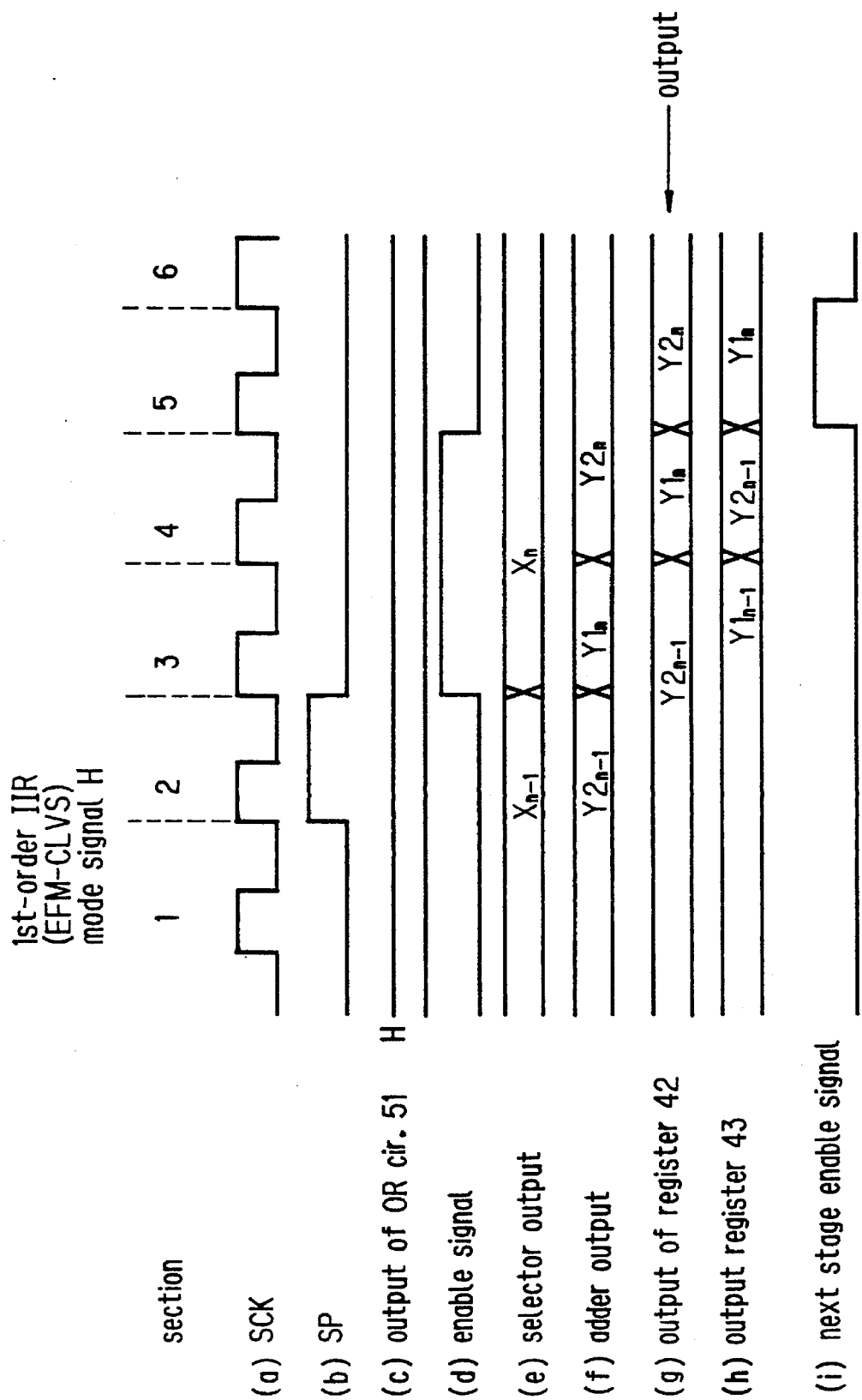

1

FILTER CIRCUIT, FILTERING METHOD AND DISC ROTATION CONTROL METHOD AND APPARATUS

BACKGROUND OF THE INVENTION

1. Field of the Invention

The present invention relates to a disc rotation control circuit for controlling a rotation means that rotates a disc.

2. Description of the Related Art

In recent years, various optical recording/reproduction apparatuses have been developed which record or reproduce information onto or from a 3.5-inch CD (compact disc), MO (magneto-optical) disc, or the like.

On the other hand, more compact magneto-optical recording/reproduction apparatuses have been developed for use in personal audio equipment (portable, stationary or vehicular equipment). For example, a MD recording/reproduction apparatus is known which records or reproduces information onto or from a recording medium (hereinafter called "MD") in which a 64-mm read-only (reproduction-only) optical disc (ROM disc), readable/writable, i.e., rewritable MO disc, or hybrid disc (partial ROM disc) having a readable/writable (i.e., rewritable) region and a read-only region is incorporated in a cartridge.

In this MD recording/reproduction apparatus, when the MD is a MO disc or a hybrid disc, data is recorded according to a magnetic modulation overwrite recording scheme.

On the other hand, reproduction from the MD is performed in the following manner. In the case of a ROM disc having the same structure as a CD, a reproduction signal is detected by utilizing diffraction of light by a bit array of a target track. In the case of a readable/writable magneto-optical disc, a reproduction signal is detected by detecting a difference in the polarization angle (Kerr rotation angle) of reflection light from a target track. In the case of a hybrid disc, for a read-only region (ROM region), a reproduction signal is detected by utilizing diffraction of light by a bit array of a target track in the same manner as in a ROM disc. For a readable/writable region (magneto-optical region), a reproduction signal is detected by detecting a difference in the polarization angle (Kerr rotation angle) of reflection light from a target track in the same manner as in a magneto-optical disc.

In the development process of personal audio equipment, circuit elements of the above MD recording/reproduction apparatus have been integrated and parts of its mechanisms have been optimized, to make the entire apparatus more compact and lighter. Further, the MD recording/reproduction apparatus is now capable of battery-powered operation because of its low power consumption. Further, in addition to the advantages that the MD has a storage capacity (120 Mbytes) that is approximately equal to that of an existing 3.5-inch MO disc and that different types of MDs can be used interchangeably, the manufacturing cost of the apparatus and the recording medium can be reduced by virtue of mass-production effects as compared to other MO disc drives. In addition, the reliability of the MD recording/reproduction apparatus is sufficiently assured from its past performance when used in personal audio equipment.

By the way, in the above-described conventional MD recording/reproduction apparatus, data that has been subjected to error correction coding, i.e., the ACIRC (advanced cross interleave Reed-Solomon code) coding and modulation suitable for recording, i.e., the EFM (eight-to-fourteen modulation) is recorded onto and reproduced from a disc being subjected to the rotation control of constat linear velocity (hereinafter called "CLV control").

In the optical recording/reproduction apparatus for a CD, the CLV control is performed according to the linear interpolation oversampling scheme while the rotation speed of a spindle motor for rotating a CD is detected. In the optical recording/reproduction apparatus for a MO disc, the CLV control is performed by using an analog LPF (lowpass filter) while the rotation speed of a spindle motor for rotating a MO disc is detected.

Further, the CLV control includes a mode for controlling only the rotation speed (hereinafter called "CLVS control") that is performed at a start of rotation of a spindle motor, for instance, when a disc is inserted, and a mode for controlling both of the rotation speed and the phase (hereinafter called "CLVP control") that is performed after the end of the CLVS control.

Japanese Patent Application No. Hei. 4-130986 (filed May 22, 1992; a corresponding U.S. patent application is now pending) and U.S. Pat. No. 5,054,014 (patented Oct. 1, 1991) relate to the disc rotation control apparatus of this invention, each of which is owned by the present assignee and hereby incorporated by reference.

Also the above MD recording/reproduction apparatus has the CLVS control mode and the CLVP control mode. Further, the MD recording/reproduction apparatus has two modulation schemes: EFM (for a ROM disc) and ADIP (address in pregroove; for a MO disc or a partial ROM disc). That is, the MD recording/reproduction apparatus is required to perform the four kinds of CLV control for the two modulation schemes and the two CLV control schemes.

The conventional MD recording/reproduction apparatus accommodates the two CLV control modes also by different control circuits. Therefore, to perform the four kinds of CLV control of EFM-CLVS, EFM-CLVP, ADIP-CLVS and ADIP-CLVP, the configuration of the control circuits (particularly loop filters (lowpass filters)) becomes complex. Thus, there is a problem that it is difficult to realize a compact apparatus, which is expected of compact personal audio equipment.

SUMMARY OF THE INVENTION

The present invention has been made in view of the above circumstances, and has an object of enabling a filtering operation with a compact and simple configuration.

A filter circuit according to the invention comprises selective output means for selectively outputting an input signal or an output signal; first amplifying means for amplifying an output of the selective output means at a first amplification factor; first delay output means for delaying a received signal by a first delay time, and for outputting a delayed signal as the output signal; second delay output means for delaying the output signal as output from the first delay means by a second delay time, and for outputting a delayed signal; second amplifying means for amplifying an output of the second delay output means at a second amplifying factor; adding means for adding together an output of the first amplifying means and an output of the second amplifying means, and for supplying an addition signal to the first delay output means; and control means for controlling selection of the selective output means in accordance with an order of a filtering operation.

A filtering method according to the invention comprises the steps of selectively outputting an input signal or an output signal; amplifying a selectively output signal at a first amplification factor; adding together a signal amplified at the first amplification factor and another signal amplified at a second amplification factor; delaying an addition signal by a first delay time, and outputting a delayed signal as the output signal; delaying the output signal by a second delay time, and outputting a delayed signal; amplifying the delayed signal delayed by the second delay time at a second amplifying factor, and outputting an amplified signal as said another signal to be added to the signal amplified at the first amplification factor; and controlling selection between the input signal and the output signal in accordance with an order of a filtering operation.

A disc rotation control apparatus according to the invention comprises control signal input means for inputting a control signal relating to rotation of a disc; selective output means for selectively outputting the control signal or an output signal; first amplifying means for amplifying an output of the selective output means at a first amplification factor; first delay output means for delaying a received signal by a first delay time, and for outputting a delayed signal as the output signal; second delay output means for delaying the output signal as output from the first delay means by a second delay time, and for outputting a delayed signal; second amplifying means for amplifying an output of the second delay output means at a second amplifying factor; adding means for adding together an output of the first amplifying means and an output of the second amplifying means, and for supplying an addition signal to the first delay output means; and control means for controlling selection of the selective output means in accordance with a drive mode of the disc.

A disc rotation control method according to the invention comprises the steps of selectively outputting a control signal relating to rotation of a disc or an output signal; amplifying a selectively output signal at a first amplification factor; adding together a signal amplified at the first amplification factor and another signal amplified at a second amplification factor; delaying an addition signal by a first delay time, and outputting a delayed signal as the output signal; delaying the output signal by a second delay time, and outputting a delayed signal; amplifying the delayed signal delayed by the second delay time at a second amplifying factor, and outputting an amplified signal as said another signal to be added to the signal amplified at the first amplification factor; and controlling selection between the control signal and the output signal in accordance with a drive mode of the disc.

In the filter circuit according to the invention, the selective output means selectively outputs an input signal or an output signal. The first amplifying means amplifies an output of the selective output means at a first amplification factor. The first delay output means delays a received signal by a first delay time, and outputs a delayed signal as the output signal. The second delay output means delays the output signal as output from the first delay means by a second delay time, and outputs a delayed signal. The second amplifying means amplifies an output of the second delay output means at a second amplifying factor. The adding means adds together an output of the first amplifying means and an output of the second amplifying means, and supplies an addition signal to the first delay output means. The control means controls selection of the selective output means in accordance with an order of a filtering operation.

In the filtering method according to the invention, first, an input signal or an output signal is selectively output. A selectively output signal is amplified at a first amplification factor. A signal amplified at the first amplification factor and another signal amplified at a second amplification factor are added together. An addition signal is delayed by a first delay time, and output as the output signal. The output signal is delayed by a second delay time, and then output. The signal delayed by the second delay time is amplified at a second amplifying factor, and output as said another signal to be added to the signal amplified at the first amplification factor. Selection between the input signal and the output signal is controlled in accordance with an order of a filtering operation.

In the disc rotation control apparatus according to the invention, the control signal input means receives a control signal relating to rotation of a disc. The selective output means selectively outputs the control signal or an output signal. The first amplifying means amplifies an output of the selective output means at a first amplification factor. The first delay output means delays a received signal by a first delay time, and outputs a delayed signal as the output signal. The second delay output means delays the output signal as output from the first delay means by a second delay time, and outputs a delayed signal. The second amplifying means amplifies an output of the second delay output means at a second amplifying factor. The adding means adds together an output of the first amplifying means and an output of the second amplifying means, and supplies an addition signal to the first delay output means. The control means controls selection of the selective output means in accordance with a drive mode of the disc.

In the disc rotation control method according to the invention, first, a control signal relating to rotation of a disc or an output signal is selectively output. A selectively output signal is amplified at a first amplification factor. A signal amplified at the first amplification factor and another signal amplified at a second amplification factor are added together. An addition signal is delayed by a first delay time, and output as the output signal. The output signal is delayed by a second delay time, and then output. The signal delayed by the second delay time is amplified at a second amplifying factor, and output as said another signal to be added to the signal amplified at the first amplification factor. Selection between the input signal and the output signal 1s controlled in accordance with a drive mode of the disc.

As described above, in the filtering method according to the invention, first, an input signal or an output signal is selectively output. A selectively output signal is amplified at a first amplification factor. A signal amplified at the first amplification factor and another signal amplified at a second amplification factor are added together. An addition signal is delayed by a first delay time, and output as the output signal. The output signal is delayed by a second delay time, and then output. The signal delayed by the second delay time is amplified at a second amplifying factor, and output as said another signal to be added to the signal amplified at the first amplification factor. Selection between the input signal and the output signal is controlled in accordance with an order of a filtering operation. Therefore, a first-order IIR filter and a second-order IIR filter can be realized selectively with a simple configuration.

In the disc rotation control method and apparatus according to the invention, first, a control signal relating to rotation of a disc or an output signal is selectively output. A selectively output signal is amplified at a first amplification factor. A signal amplified at the first amplification factor and another signal amplified at a second amplification factor are added together. An addition signal is delayed by a first delay time, and output as the output signal. The output signal is delayed by a second delay time, and then output. The signal delayed by the second delay time is amplified at a second amplifying factor, and output as said another signal to be added to the signal amplified at the first amplification factor. Selection between the input signal and the output signal is controlled in accordance with a drive mode of the disc. Therefore, different types of CLV control can be performed with a simple configuration, to make it possible to realize a more compact, less expensive apparatus.

BRIEF DESCRIPTION OF THE DRAWINGS

FIG. 6 is a timing chart showing an operation of the second-order IIR filter of FIG. 5; and FIG. 7 is a timing chart showing an operation of the first-order IIR filter of FIG. 4.

DETAILED DESCRIPTION OF THE PREFERRED EMBODIMENTS

Embodiments of the present invention will be described with reference to the accompanying drawings.

Figure 1:
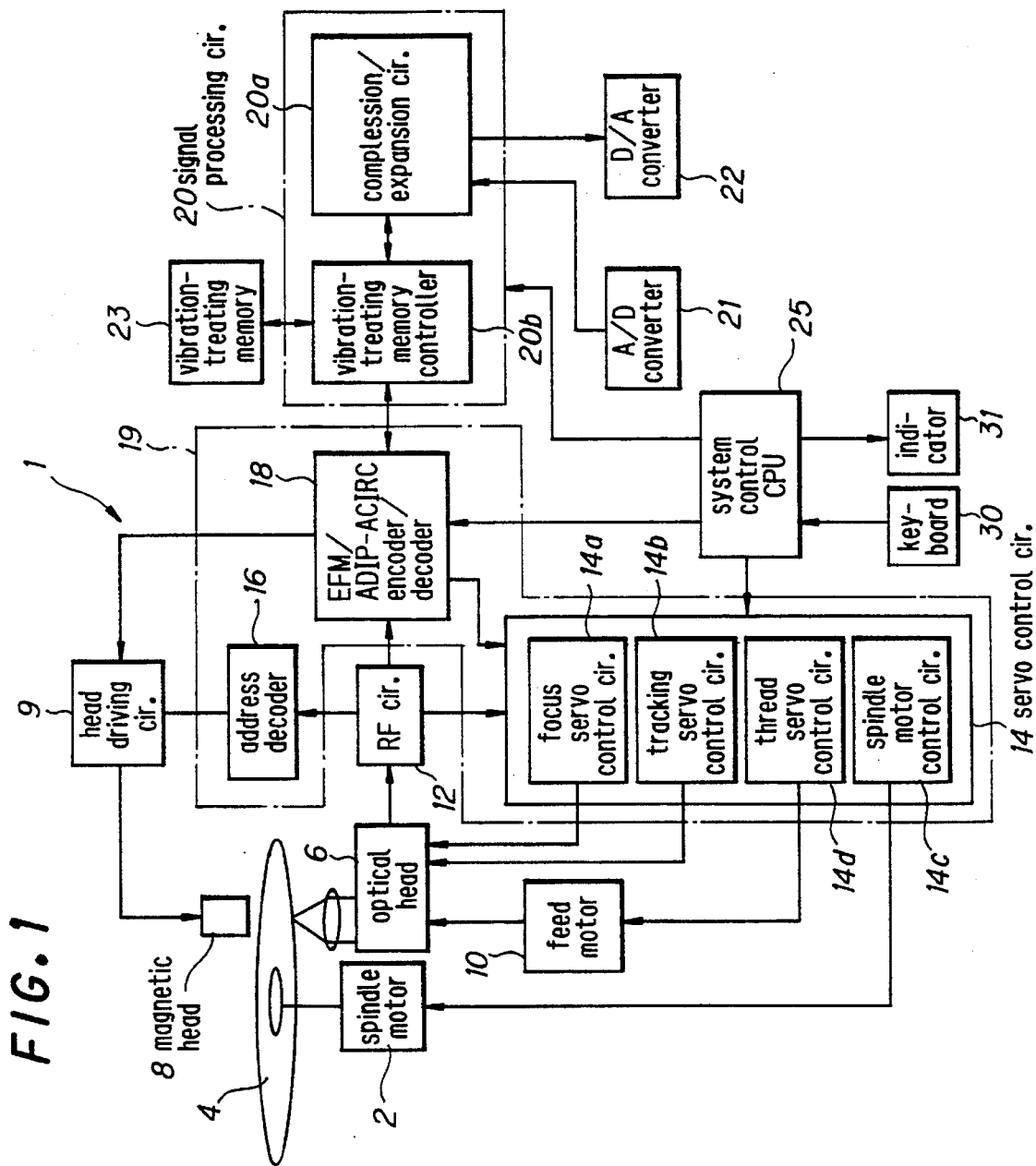
FIG. 1 is a block diagram showing a configuration of a MD recording/reproduction apparatus.

FIG. 1 shows a configuration of a MD recording/reproduction apparatus according to a first embodiment of the invention. In the MD recording/reproduction apparatus 1 of this embodiment, an optical head 6 is composed of optical parts including a laser light source such as a laser diode, a collimator lens, an objective lens, a polarizing beam splitter, and a cylindrical lens, and a photodetector that is divided into sections having a prescribed arrangement, although such components are not shown in FIG. 1. The optical head 6 is disposed on the opposite side of a MD 4 from a magnetic head 8, and positioned by a feed motor 10.

By detecting laser light reflected from a target track, the optical head 6 detects a focus error signal according to, for instance, the astigmatism method and a tracking error signal according to, for instance, the push-pull method.

Where the MD (mini disc (trademark)) 4, which is rotation-driven by a spindle motor 2, is a rewritable MO (magneto-optical disc) or a hybrid disc (its magneto-optical region), magnetic modulation overwrite recording is performed along recording tracks of the MD 4 by applying, to the tracks from the magnetic head 8 that is driven by a head driving circuit 9, a magnetic field that is modulated in accordance with recording data while applying laser light to the tracks from the optical head 6.

During a reproduction mode, by tracing recording tracks of the MD 4 by the optical head 6, data is reproduced magneto-optically (for a MO disc or a magneto-optical region of a hybrid disc) or optically (for a ROM disc or a ROM region of a hybrid disc). That is, a reproduction signal is generated by detecting a difference in the polarization angle (Kerr rotation angle) or in the light quantity of reflection light from a target track.

An output of the optical head 6 is supplied to a RF circuit 12. The RF circuit 12 not only extracts a focus error signal and a tracking error signal from the output of the optical head 6 and supplies those signals to a servo control circuit 14, but also supplies a reproduction signal to an address decoder 16 after binarizing it. The address decoder 16 decodes addresses from the received binary reproduction signal, and supplies the addresses to an EFM/ADIP-ACIRC encoder/decoder 18. Further, the address decoder 16 supplies binary reproduction data other than the address-related binary reproduction data to the EFM/ADIP-ACIRC encoder/decoder without processing it.

The servo control circuit 14, the address decoder 16, and the EFM/ADIP-ACIRC encoder/decoder are incorporated together in an integrated circuit 19.

The servo control circuit 14 consists, for instance, of a focus servo control circuit 14a, a tracking servo control circuit 14b, a spindle motor servo control circuit 14c, and a thread servo control circuit 14d.

The focus servo control circuit 14a performs focus control on the optics of the optical head 6 so as to make the focus error signal zero. The tracking servo control circuit 14b controls the feed motor 10 for the optical head so as to make the tracking error signal zero.

The spindle motor servo control circuit 14c controls the spindle motor 2 so that the spindle motor 2 rotation-drives the MD 4 at a prescribed rotation speed (for instance, at a constant linear velocity). The thread servo control circuit 14d moves the optical head 6 by the feed motor 10 to a target track position of the MD 4 designated by a system control CPU 25.

The EFM/ADIP-ACIRC encoder/decoder 18 performs not only error correction coding, i.e., ACIRC coding on data (recording data) supplied via a signal processing circuit 20, but also modulation suitable for the recording, i.e., EFM modulation.

The signal processing circuit 20 has a compression/expansion circuit 20a that performs input/output of an audio signal via an A/D converter 21 and a D/A converter 22, compresses input data and supplies the compressed data to the EFM/ADIP-ACIRC encoder/decoder 18, and expanding a reproduction signal supplied from the EFM/ADIP-ACIRC encoder/decoder 18. The signal processing circuit 20 further has a vibration-treating memory controller 20b for controlling a vibration-treating memory 23 that temporarily stores data of the reproduction signal sent from the EFM/ADIP-ACIRC encoder/decoder 18.

The vibration-treating memory controller 20b is provided to always assure stable data reproduction even when vibration or the like deviates the optical head 6 from a target track. That is, the vibration-treating memory controller 20b processes a reproduction signal stored in the vibration-treating memory 23 until restoration is made.

Coded data that is output from the EFM/ADIP-ACIRC encoder/decoder 18 is supplied to a magnetic head driving circuit 9 as recording data. The magnetic head driving circuit drives the magnetic head 8 so that the magnetic head 8 applies, to the MD 4, a magnetic field that is modulated in accordance with the recording data.

While receiving a write command from a keyboard 30, the system control CPU 25 controls recording positions on the MD 4 so that recording data is recorded on recording tracks on the MD 4, and supplies an indicator 31 with a message indicating a recording operation. The control of recording portions is performed such that recording positions on the MD 4 indicated by coded data that is output from the EFM/ADIP-ACIRC encoder/decoder 18 are managed by the system control CPU 25 and the system control CPU 25 supplies the servo control circuit 14 with a control signal designating recording positions on the recording tracks of the MD 4.

While receiving a read command from the keyboard 30, the system control CPU 25 controls reproduction positions on the recording tracks of the MD 4 so that reproduction data is obtained continuously. The control of reproduction positions is performed such that positions of reproduction data on the MD 4 are managed by the system control CPU 25 and the system control CPU 25 supplies the servo control circuit 14 with a control signal designating reproduction positions on the recording tracks of the MD 4. The EFM/ADIP-ACIRC encoder/decoder 18 performs demodulation and error correction ACIRC decoding on input binary reproduction data, and outputs an audio signal via the signal processing circuit 20.

Figure 2:
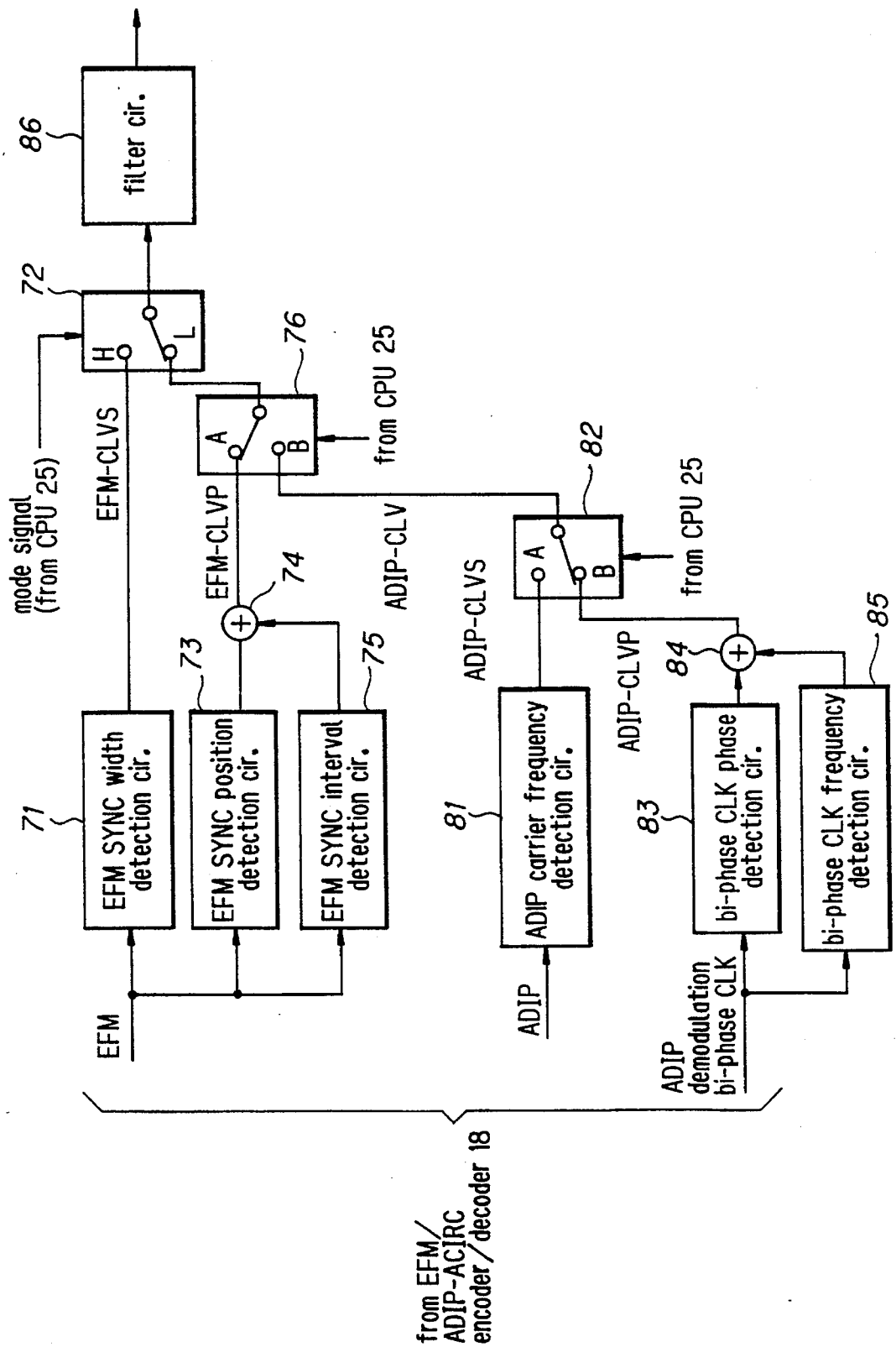
FIG. 2 is a block diagram showing a configuration of an embodiment of a spindle motor servo control circuit 14c shown in FIG. 1.

Next, a description will be made of the spindle motor servo control circuit 14c, which is the main part of this embodiment. The spindle motor servo control circuit 14c is constructed, for instance, as shown in FIG. 2. Where the MD 4 is a ROM disc or a hybrid disc (its ROM region), EFM-modulated data (hereinafter referred to as "EFM data") to be recorded onto or reproduced from the MD 4 is supplied to an EFM sync width detection circuit 71, an EFM Sync position detection circuit 73, and an EFM sync interval detection circuit 75 of the spindle motor servo control circuit 14c.

The EFM sync width detection circuit 71 detects a sync pattern width from the input EFM signal, comparing the detected width with a reference width, and supplies a resulting error (frequency error) signal to terminal H of a switch 72. The EFM sync position detection circuit 73 detects a position of sync pattern occurrence from the EFM signal, compares it with a reference position (reference timing of occurrence), and outputs a resulting phase error. The EFM sync interval detection circuit 75 detects a sync pattern interval of the EFM signal, compares it with a reference interval, and outputs a resulting frequency error. An adder 74 adds together the outputs of the EFM sync position detection circuit 73 and the EFM sync interval detection circuit 75, and supplies an addition result to terminal A of a switch 76.

On the other hand, where the MD 4 is an MO disc or a hybrid disc (its MO region), an ADIP signal (stored in advance in the pregrooves of the MD 4) reproduced from the MD 4 and a biphase clock signal obtained by demodulating the ADIP signal are supplied from the EFM/ADIP-ACIRC encoder/decoder 18 to the spindle motor servo control circuit 14c. The ADIP signal is input to an ADIP carrier frequency detection circuit 81, and the biphase clock signal is input to a biphase clock phase detection circuit 83 and a biphase clock frequency detection circuit 85.

The ADIP carrier frequency detection circuit 81 detects a carrier frequency of the input ADIP signal, compares it with a reference frequency, and supplies a resulting frequency error signal to terminal A of a switch 82. The biphase clock phase detection circuit 83 detects a phase of the input biphase clock signal, compares it with a reference phase, and supplies a resulting phase error signal to an adder 84. The biphase clock frequency detection circuit 85 detects a frequency of the input biphase clock signal, compares it with a reference frequency, and supplies a resulting frequency error signal to the adder 84. The adder 84 adds together the outputs of the biphase clock phase detection circuit 83 and the biphase clock frequency detection circuit 85, and supplies an addition result to terminal B of the switch 82.

An output of the switch 82 is supplied to terminal B of the switch 76. An output of the switch 76 is supplied to terminal L Of the switch 72. And an output of the switch 72 is supplied to a filter circuit 86.

Next, a description will be made of the operation of the spindle motor servo control circuit 14c. Where the MD 4 is a ROM disc or a hybrid disc (its ROM region), the EFM sync width detection circuit 71 detects a sync pattern width of an input EFM signal, compares the detected width (11 T (T: pit cell interval) in a normal operation) with the prescribed reference width, and outputs a resulting error signal. Since the system control CPU 25 sets the mode signal to H immediately after starting the drive of the MD 4, the error signal that is output from the EFM sync width detection circuit 71 is supplied to the filter circuit 85 via terminal H of the switch 72. The error signal is processed in the filter circuit 85 in a manner described later and supplied to the spindle motor 2, to effect the EFM-CLVS control.

On the other hand, the EFM sync interval detection circuit 75 detects a sync pattern interval (interval between one sync pattern and the next sync pattern) of the input EFM signal, compares the detected interval with the reference interval, and outputs a resulting error signal. The EFM sync position detection circuit 73 detects a position (timing) of sync pattern occurrence of the input EFM signal, compares the detected position with the prescribed reference position, and outputs a resulting error signal. That is, the EFM sync interval detection circuit 75 generates and outputs the frequency error signal, and the EFM sync position detection circuit 73 generates and outputs the phase error signal. The adder 74 adds together the frequency error signal and the phase error signal, and supplies an addition result to terminal A of the switch 76.

When the rotation speed of the MD 4 has reached a prescribed linear velocity as a result of the EFM-CLVS control, the system control CPU 25 changes over the switch 72 to terminal L. In the case of a ROM disc or a hybrid disc (its ROM region), since the switch 76 is set to terminal A, the error signal that is output from the adder 74 is supplied to the filter circuit 86 via terminal L of the switch 72. Thus, the EFM-CLVP control is effected.

Where the MD 4 is a MO disc or a hybrid disc (its MO region), the switch 72 is set to terminal L, and the switch 76 is set to terminal B. During the build-up period, the switch 82 is set to terminal A.

The ADIP carrier frequency detection circuit 81 compares a carrier frequency (22.05 kHz) of an input ADIP signal with the prescribed reference frequency, and generates and outputs a resulting error signal, which is supplied to the filter circuit 86 via the switches 82, 76 and 72. Thus, the ADIP-CLVS control is effected.

When the rotation speed of the MD 4 has reached a prescribed linear velocity, the system control CPU 25 changes over the switch 82 to terminal B. In this case, the biphase clock frequency detection circuit 85 compares a frequency (6.3 kHz) of a biphase clock signal with the reference frequency, and generates and outputs a resulting frequency error signal. The biphase clock phase error detection circuit 83 compares a phase of the biphase clock signal with the prescribed phase, and generates and outputs a resulting phase error signal. The adder 84 adds together the frequency error signal that is output from the biphase clock frequency detection circuit 85 and the phase error signal that is output from the biphase clock phase detection signal 83.

An output of the adder 84 is supplied to the filter circuit 86 via the switches 82, 76 and 72. Thus, the ADIP-CLVP control is effected.

Figure 3:
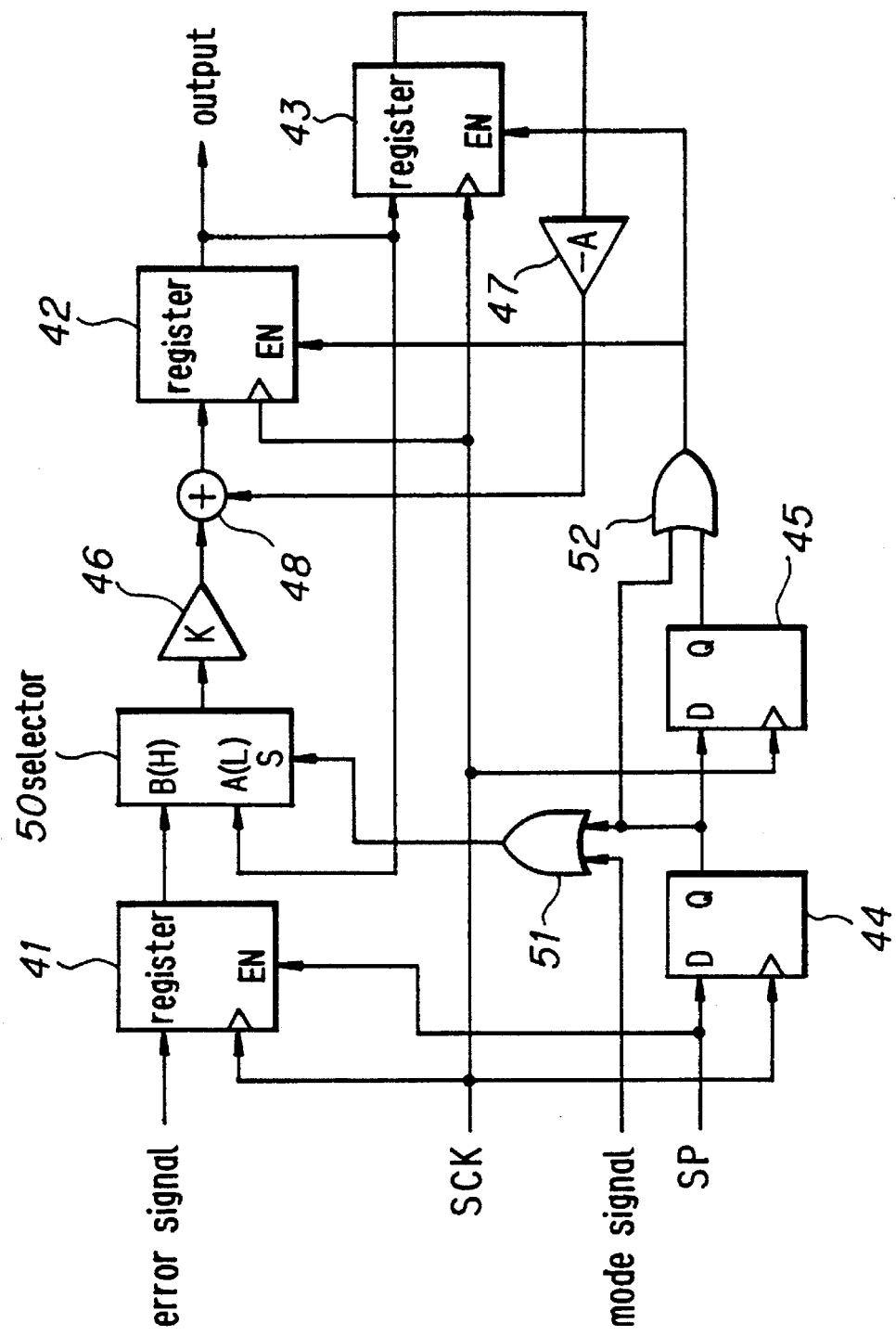
FIG. 3 is a block diagram showing a configuration of a filter circuit 86 shown In FIG. 2.

Referring to FIG. 3, a description will be made of a configuration of the filter circuit 86. As shown in FIG. 3, the filter circuit 86 has a register 41 that receives, from the switch 72, the error signals, i.e., the speed error signal and the phase error signal. The register 41 is rendered in an enable state while a sampling signal SP is at a high level, for instance. While the register 41 is in the enable state, it latches an error signal in synchronism with an edge of a system clock signal SCK. An output of the register 41 is supplied to terminal B of a selector 50. Terminal A of the selector 50 is supplied with an output of a register 43. The selector 50 selectively outputs a signal being input to terminal B when receiving a control signal H (high level) from an OR circuit 51, and selectively outputs a signal being input to terminal A when receiving a control signal L (low level).

The signal that is output from the selector 50 is multiplied by K in an amplifier 46, and then input to an adder 48. The adder 48 adds together the signal received from the amplifier 46 and a signal received from an amplifier 47, and supplies an addition result to a register 42. When receiving a signal H at its enable terminal from an OR circuit 52, the register 42 latches the output of the adder 48 in synchronism wit an edge of the system clock signal SCK.

The register 43 latches an output of the register 42 in synchronism with an edge of the system clock signal SCK at a timing when it receives a signal H at its enable terminal from the OR circuit 52. An output of the register 43 is multiplied by −A in the amplifier 47, and supplied to the adder 48.

A flip-flop 44 latches the sampling signal SP in synchronism with an edge of the system clock signal SCK, and supplies the latched signal to one input of the OR circuit 51 and a downstream flip-flop 45. The other input of the OR circuit 51 is supplied with the mode signal from the system control CPU 25. The mode signal is made H during the EFM-CLVS mode, and made L during the other modes, i.e., the EFM-CLVP, ADIP-CLVS and ADIP-CLVP modes.

The flip-flop 45 latches the output of the upstream flip-flop 44 in synchronism with an edge of the system clock signal SCK, and supplies the latched signal to one input of the OR circuit 52. The other input of the OR circuit 52 is supplied with the output itself of the flip-flop 44. The output of the OR circuit 52 is supplied to the enable terminals of the registers 42 and 43.

Figure 4:
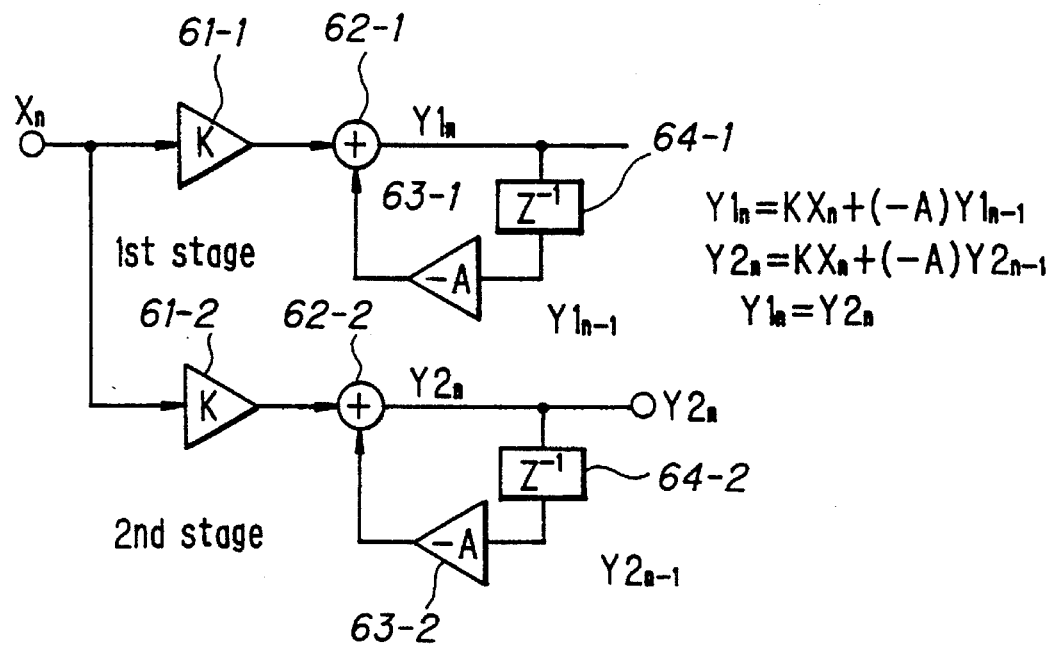
FIG. 4 shows an equivalent circuit of the filter circuit of FIG. 3 when it operates as a first-order IIR filter.

During the EFM-CLVS control, the filter circuit 86 constitutes a first-order IIR lowpass filter as shown in an equivalent circuit of FIG. 4. During the other control operations, i.e., the EFM-CLVP control, ADIP-CLVS control and ADIP-CLVP control, the filter circuit 86 constitutes a second-order IIR lowpass filter as shown in an equivalent circuit of FIG. 5.

Next, a description will be made of the operation of the filter circuit of FIG. 3. In the following description, Y1n and Y2n respectively represent a first-stage filter output and a second-stage filter output in each of FIGS. 4 and 5. $Y1n-1$ and $Y2n-1$ respectively represent a first-stage filter output and a second-stage filter output of the preceding sample.

During the control operations other than the EFM-CLVS control, i.e., the EFM-CLVP control, ADIP-CLVS control and ADIP-CLVP control, a mode signal L is supplied to one input of the OR circuit 51. A sampling signal SP (hereinafter abbreviated as SP; see FIG. 6(b)) that is generated in section 2 of FIG. 6 is delayed by the flip-flop 44 by one clock period of the system clock signal SCK (hereinafter abbreviated as SCK; see FIG. 6(a)), and input to the other input of the OR circuit 51. Therefore, the OR circuit 51 outputs H (see FIG. 6(c)) in section 3 of FIG. 6.

The output of the flip-flop 44 is further delayed by one clock period of SCK by the flip-flop 45, and input to the OR circuit 52. The OR circuit 52 calculates the logical sum of the outputs of the flip-flops 44 and 45, and outputs H in sections 3 and 4 of FIG. 6 as enable signals (see FIG. 6(d)).

The error signal is taken in, as Xn, by the register 41 in synchronism with an edge of SCK, and input to terminal B of the selector 50. In section 3, the selector 50 outputs Xn (see FIG. 6(e)), because it selects the signal being input to terminal B in accordance with the output (H; see FIG. 6(c)) of the OR circuit 51.

On the other hand, the register 42 outputs the second-stage (see FIG. 5) filter output $Y2n-1$ (see FIG. 6(g)) of the preceding sample, and the register 43 outputs the first-stage (see FIG. 5) filter output $Y1n-1$ (see FIG. 6(h)) of the preceding sample. The output Xn of the selector 50 is multiplied by K by the amplifier 46, and input to the adder 48. The output $Y1n-1$ of the register 43 is multiplied by −A by the amplifier 47, and input to the adder 48. The adder 48 adds together the two inputs according to Equation (1), and outputs an addition result.

$$Y1n = KXn + (-A)Y1n-1 \qquad (1)$$

In section 4, the register 42 outputs, as the first-stage filter output Y1n (see FIG. 6(g)), the sum that has been calculated according to Equation (1). In section 4, the register 43 latches and outputs the output $Y2n-1$ of the register 42 of section 3 (see FIG. 6(h)). Further, in section 4, since the output of the OR circuit 51 is L and therefore the selector 50 selects the signal being input to terminal A, the selector 50 outputs the output Y1n of the register 42. The output Y1n is multiplied by K by the amplifier 46, and input to the adder 48. The adder adds together this input and the output $Y2n-1$ of the register 43 multiplied by −A by the amplifier 47, and outputs an addition result to the register 42. In this manner, in section 5, the register 42 is controlled according to Equation (2).

$$Y2n = KY1n + (-A)Y2n-1 \qquad (2)$$

In section 5 and the following sections, the register 42 outputs Y2n and the register 43 outputs Y1n. Since thereafter the enable signal is L (see FIG. 6(d)), the data of the registers 42 and 43 do not vary until reception of the next sample.

Figure 5:
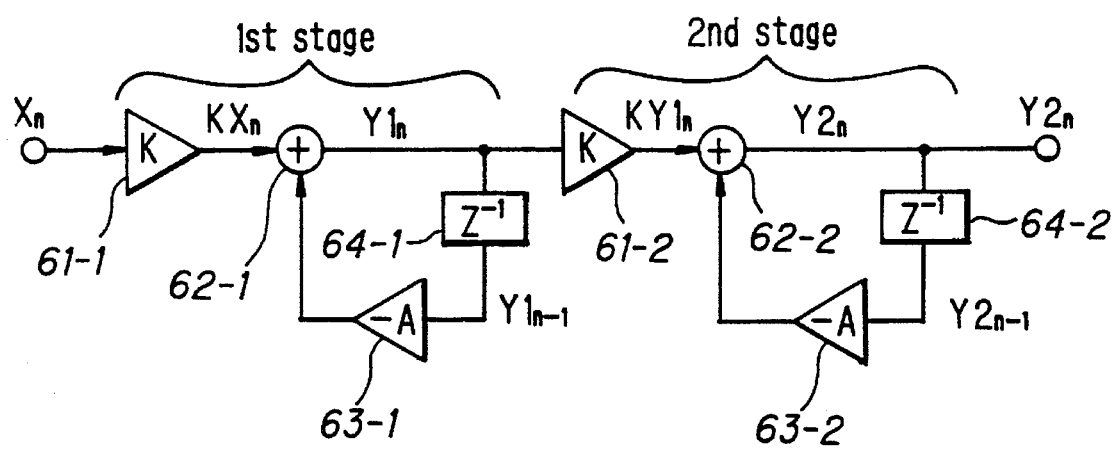
FIG. 5 shows an equivalent circuit of the filter circuit of FIG. 3 when it operates as a second-order IIR filter.

With the above operation, the filter circuit 86 functions as the second-order IIR lowpass filter as shown in the equivalent circuit of FIG. 5.

That is, in the first stage, an input Xn is multiplied by K by an amplifier 61-1, summed with an output of an amplifier 63-1 by an adder 62-1, and output as a first-stage output Y1n. The output Y1n is delayed by a delay circuit 64-1. When the next sample is input, the delayed output Y1n is multiplied by −A by an amplifier 63-1, and input to the adder 62-1.

In the second stage, the same processing as in the first stage is performed by an amplifier 61-2, an adder 62-2, a delay circuit 64-2, and an amplifier 63-2, to produce an output Y2n.

On the other hand, referring to FIG. 3, during the EFM-CLVS control, a mode signal H is input to the OR circuit 51, which therefore always outputs H (see FIG. 7(c)). The OR circuit 52 outputs H only in sections 3 and 4 (see FIG. 7(d))

as in the case of the control operations other than the EFM-CLVS control.

The error signal is taken in by the register 41 as Xn, and input to terminal B of the selector 50. Since the OR circuit 51 always outputs H (see FIG. 7(c)), the selector always selects the signal being input to terminal B. In section 3, the selector 50 outputs Xn (see FIG. 7(e)). In section 3, the register 42 outputs a second-stage filter output Y2n−1 of the preceding sample (see FIG. 7(g)), and the register 43 outputs a first-stage filter output Y1n−1 of the preceding sample (see FIG. 7(h)). The output Xn of the selector 50 is multiplied by K by the amplifier 46, summed by the adder 48 with the output Yn−1 of the register 43 multiplied by −A by the amplifier 47 according to Equation (3), and input to the register 42.

$$Y1n = KXn + (-A)Y1n-1 \quad (3)$$

In section 4, the register 42 outputs, as the first-stage filter output, the sum Y1n that has been calculated according to Equation (3). (This output is not used actually, i.e., disregarded.) In section 4, the register 43 latches and outputs the output Y2n−1 of the register 32 of section 3 (see FIG. 7(h)). Since the selector 50 always selects terminal B, it outputs Xn in section 4. The output Xn is multiplied by K by the amplifier 46, summed by the adder 48 with the output Y2n−1 of the register 43 multiplied by −A by the amplifier 47 according to Equation (4), and input to the register 42 (see FIG. 7(f)).

$$Y2n = KXn + (-A)Y2n-1 \quad (4)$$

In section 5, the register 42 outputs, as the second-stage filter output, the sum Y2n that has been calculated according to Equation (4) (see FIG. 7(g)).

The output Y2n is supplied to a register of the next stage (not shown), where it is latched in accordance with a next stage enable signal (FIG. 7(i)). Thus, the spindle motor 2 is controlled. In section 5 and the following sections, the register 42 outputs Y2n and the register 43 outputs Y1n. Since thereafter the enable signal (see FIG. 7(d)) is L, the data of the registers 42 and 43 do not change until reception of the next sample.

As described above, during the EFM-CLVS control, since the selector 50 always selects terminal B, the first-stage filter output Y1n is not input to the second stage and the adder 48 performs the same calculation in steps 3 and 4. Therefore, Y1n=Y2n. In an actual operation, Y2n is latched in the next stage and the first-stage filter output Y1n is disregarded. With the above operations, the filter circuit 86 functions as the first-order IIR lowpass filter as shown in the equivalent circuit of FIG. 4.

That is, in the first stage, an input Xn is subjected to substantially ineffective processing of an amplifier 61-1, an adder 62-1, a delay circuit 64-1, and an amplifier 63-1. In the second stage, the input Xn is multiplied by K by an amplifier 61-2, and summed by an adder 62-2 with an output of an amplifier 63-2. The resulting sum is output as Y2n.

The output Y2n is delayed by a delay circuit 64-2, multiplied by −A by the amplifier 63-2 at a timing of sampling the next input, and input to the adder 62-2.

In the EFM-CLVS mode, the cutoff frequency fc of the lowpass filter 86 by elongating the period of SP (reducing the frequency fs of SP). Since the filter circuit 86 is a first-order lowpass filter, the phase shift is small and a stable servo operation is obtained.

The filter types and specific examples of numerical values of the cutoff frequency fc and the sampling frequency fs for the respective modes are as follows:

| Mode | IIR filter | fc | fs |
|---|---|---|---|
| EFM-CLVS | 1st order | 19 Hz | 3.675 kHz |
| EFM-CLVP | 2nd order | 445 Hz | 88.2 kHz |
| ADIP-CLVS | 2nd order | 445 Hz | 88.2 kHz |
| ADIP-CLVP | 2nd order | 445 Hz | 88.2 kHz |

As described above, according to the spindle motor servo control circuit 14c of the above embodiment, a plurality of CLV control operations can be performed by the lowpass filter having a simple configuration. Therefore, it becomes possible to provide a more compact apparatus.

What is claimed is:

1. A filter circuit comprising:

selective output means for selectively outputting an input signal or an output signal;

first amplifying means for amplifying an output of said selective output means at a first amplification factor;

first delay output means for delaying a received signal by a first delay time, and for outputting a delayed signal as said output signal;

second delay output means for delaying said output signal as output from said first delay means by a second delay time, and for outputting a delayed signal;

second amplifying means for amplifying an output of said second delay output means at a second amplifying factor;

adding means for adding together an output of said first amplifying means and an output of said second amplifying means, and for supplying an addition signal to said first delay output means; and control means for controlling selection of said selective output means in accordance with an order of a filtering operation.

2. A filtering method comprising the steps of:

selectively outputting an input signal or an output signal;

amplifying a selectively output signal at a first amplification factor;

adding together a signal amplified at said first amplification factor and another signal amplified at a second amplification factor;

delaying an addition signal by a first delay time, and outputting a delayed signal as said output signal;

delaying said output signal by a second delay time, and outputting a delayed signal;

amplifying said delayed signal delayed by said second delay time at a second amplifying factor, and outputting an amplified signal as said another signal to be added to said signal amplified at said first amplification factor; and controlling selection between said input signal and said output signal in accordance with an order of a filtering operation.

3. A disc rotation control apparatus comprising:

control signal input means for inputting a control signal relating to rotation of a disc;

selective output means for selectively outputting said control signal or an output signal;

first amplifying means for amplifying an output of said selective output means at a first amplification factor;

first delay output means for delaying a received signal by a first delay time, and for outputting a delayed signal as said output signal;

second delay output means for delaying said output signal as output from said first delay means by a second delay time, and for outputting a delayed signal;

second amplifying means for amplifying an output of said second delay output means at a second amplifying factor;

adding means for adding together an output of said first amplifying means and an output of said second amplifying means, and for supplying an addition signal to said first delay output means; and control means for controlling selection of said selective output means in accordance with a drive mode of said disc.

4. The disc rotation control apparatus according to claim 3, wherein a first-order IIR lowpass filter or a second-order IIR lowpass filter is selectively constructed in accordance with said selection of said selective output means.

5. The disc rotation control apparatus according to claim 3, wherein said disc is a magneto-optical disc.

6. A disc rotation control method comprising the steps of:

selectively outputting a control signal relating to rotation of a disc or an output signal;

amplifying a selectively output signal at a first amplification factor;

adding together a signal amplified at said first amplification factor and another signal amplified at a second amplification factor;

delaying an addition signal by a first delay time, and outputting a delayed signal as said output signal;

delaying said output signal by a second delay time, and outputting a delayed signal;

amplifying said delayed signal delayed by said second delay time at a second amplifying factor, and outputting an amplified signal as said another signal to be added to said signal amplified at said first amplification factor; and controlling selection between said control signal and said output signal in accordance with a drive mode of said disc.

* * * * *